Oct. 13, 1931.　　F. HODGKINSON　　1,826,884
LOAD LIMITING DEVICE
Filed Jan. 29, 1931　　2 Sheets-Sheet 1
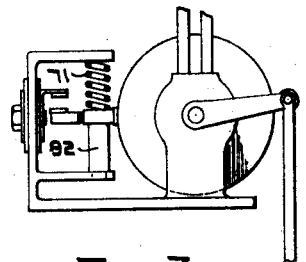
FIG. 3.
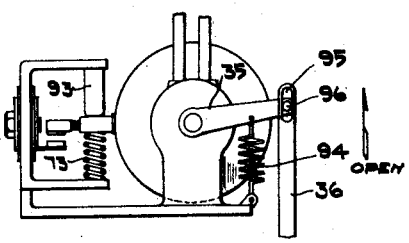
FIG. 4.
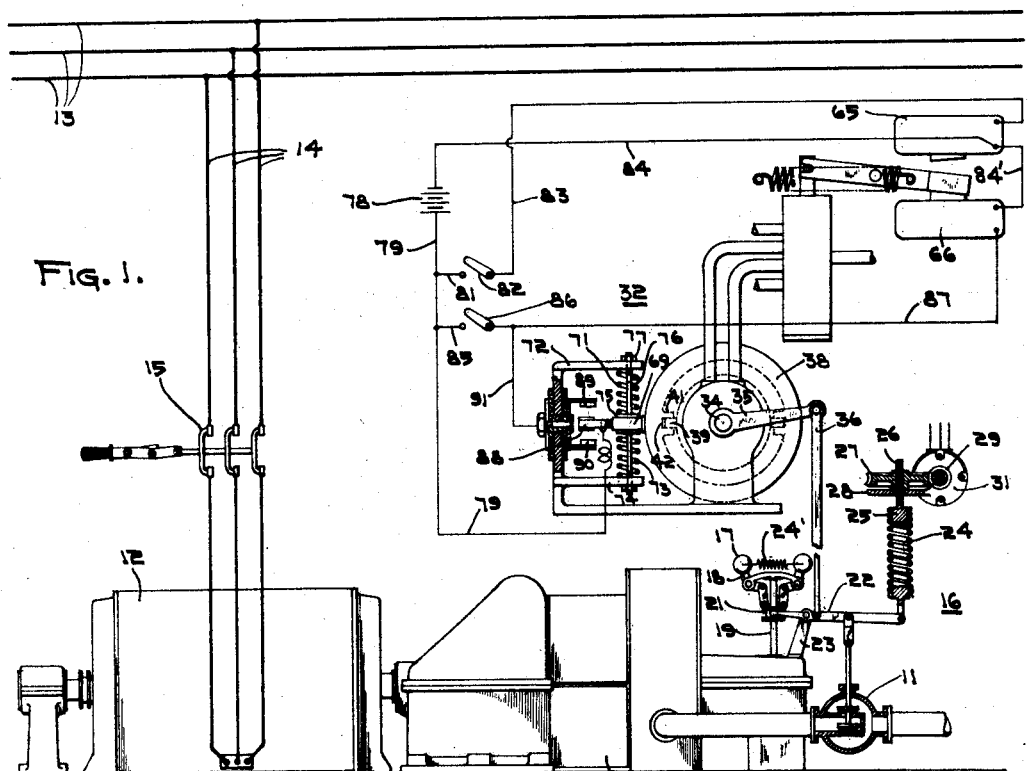
WITNESSES:　　　　　　　　　　　　　　INVENTOR
　　　　　　　　　FIG. 2.　　　　FRANCIS HODGKINSON.
　　　　　　　　　　　　　　　　　　　　BY
　　　　　　　　　　　　　　　　　　　　ATTORNEY Oct. 13, 1931.  F. HODGKINSON  1,826,884
LOAD LIMITING DEVICE
Filed Jan. 29, 1931  2 Sheets-Sheet 2

INVENTOR
FRANCIS HODGKINSON.
BY
a. B. Reavis
ATTORNEY

Patented Oct. 13, 1931

1,826,884

UNITED STATES PATENT OFFICE

FRANCIS HODGKINSON, OF PHILADELPHIA, PENNSYLVANIA, ASSIGNOR TO WESTINGHOUSE ELECTRIC & MANUFACTURING COMPANY, A CORPORATION OF PENNSYLVANIA

LOAD LIMITING DEVICE

Application filed January 29, 1931. Serial No. 512,128.

My invention relates to a load-limiting device, more particularly to a device to be used in combination with the speed-responsive governing mechanism of a prime mover and which is adapted to limit the governing mechanism to any desired rate of motive fluid admission.

Where a plurality of prime movers are connected in parallel to an electric power system which is subject to variations in load, it is sometimes desirable to maintain a fixed base load on one or more of the prime movers and to carry the variations in load on other prime movers. In this case, the load-limiting device serves to maintain a given load on the prime mover carrying base load, so long as the speed is within the normal range. In other cases, it may be desired to run a prime mover as a standby, admitting only sufficient motive fluid to maintain the prime mover in proper operating temperature condition. In this case, the device may be used to limit the maximum admission to the prime mover.

The invention has for an object to provide an improved device of the character set forth.

A further object is to provide a load-limiting device associated with the governing mechanism of a prime mover whereby the governing mechanism may be set at any desired load and the load-limiting device made operative to limit the operation of the governing mechanism to that load.

A specific object is to provide an improved load-limiting device which will release the governing mechanism in response to a predetermined departure from the normal range of speed of the prime mover.

In accordance with my invention, I provide a clutch mechanism comprising two elements, one of which is connected to the governing mechanism and actuated in accordance with the rate of admission provided by the governing mechanism, and the other of which is restrained against movement. By bringing the clutch elements into engagement, the governing mechanism is restrained from moving beyond the rate of admission at which it was set. The device may limit either the maximum or minimum load, or both.

The device is further provided with means for disengaging the clutch elements when the speed of the prime mover departs from the normal range, whereby the load-limiting action on the governor is discontinued. This is preferably accomplished by making the restraining means for the second clutch element yieldable to a predetermined force, which the governing mechanism transmits to the clutch mechanism when the speed departs from the normal range. When the restraining means yields, the clutch elements are disengaged in response to movement of the second clutch element.

The above and other objects are effected by my invention, as will be apparent from the following description and claims, taken in connection with the accompanying drawings forming a part of this application, in which:

Fig. 1 is a diagrammatic view, showing the load-limiting device applied to the speed governor of a prime mover;

Fig. 2 is an enlarged view, partly in elevation and partly in section, of a modification of a detail;

Fig. 3 is an elevational view of a modified form of load-limiting device;

Fig. 4 is a similar elevational view of another modified form; and,

Figure 5:
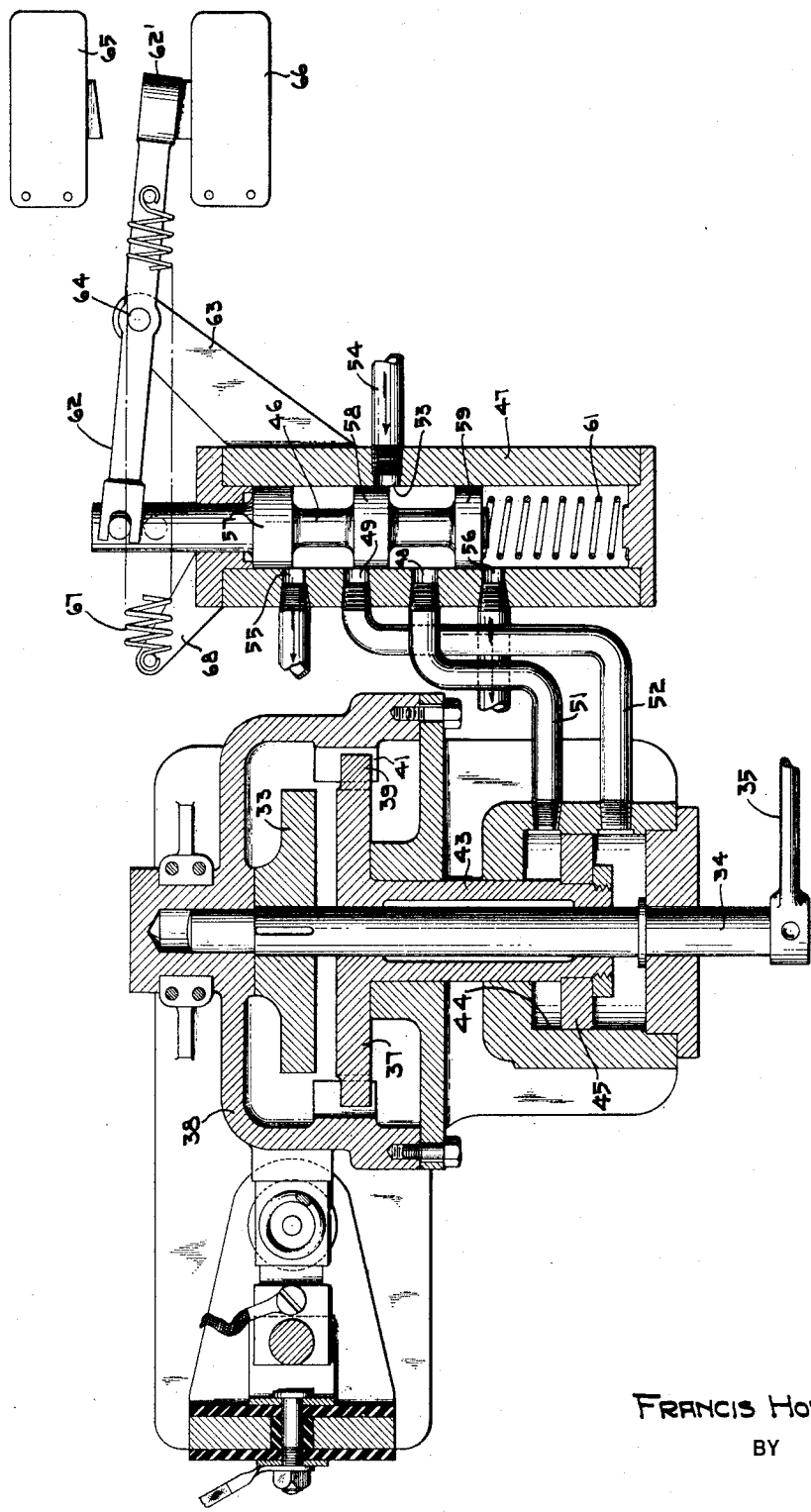
Fig. 5 is a sectional view of the load-limiting device and of the means for controlling said device, said means and the device being shown in diagrammatic relation to each other.

Referring now to the drawings more in detail, I show a steam turbine 10, having an admission valve 11. The turbine 10 drives a synchronous alternating current generator 12, which is connected to an electric power line 13 through leads 14. A circuit breaker 15 is interposed in the leads 14 for disconnecting the turbine and generator unit from the system.

The turbine is provided with any suitable speed governing mechanism known to the art. For simplicity, a direct acting governor 16 is illustrated. The governor 16 includes fly balls 17 carried by bell crank levers 18 and rotated at a speed proportional to the speed of the turbine by a shaft 19 connected to the turbine. The bell-crank levers 18 are connected to a collar 21, which is vertically movable to actuate a lever 22 fulcrumed on a bracket 23. The lever 22 is connected to and actuates the admission valve 11.

A tension spring 24 is connected at one end to the lever 22 and opposes the centrifugal force of the fly balls 17. The other end of the spring is attached to a spring-holding member 25 which has a screw-threaded stem 26. A worm gear 27 is screw-threaded on the stem and bears against a stationary member 28. The gear 27 is rotated by a worm 29 carried on the shaft of an electric speed changer motor 31.

The centrifugal force of the fly balls 17 provides a deflection of the spring 24 which varies with the centrifugal force. Upon increase in speed of the turbine and generator unit, the increased centrifugal force moves the collar 21 upwardly and the right-hand end of the lever downwardly, effecting increased tension of the spring 24 and closing movement of the admission valve 11 to restrict the increase in speed. Upon decrease in speed, the lever 22 is moved in the opposite direction by the spring 24 and actuates the admission valve 11 in opening direction to restrict the decrease in speed.

The stem 26, the gear 27, the worm 29 and speed changer motor 31 constitute a speed changer mechanism for adjusting the speed setting of the governor. By rotating the worm and gear in the direction for raising the stem 26, the tension of the spring 24 for a given position of the admission valve is increased. The turbine must operate at a higher speed to provide the centrifugal force for effecting the increased tension of the spring. The speed setting of the governor, therefore, is increased. By lowering the position of the stem 26, a decreased speed is required to produce a centrifugal force providing the required spring tension for a given position of the admission valve, and the speed setting of the governor is decreased. A second spring 24' is preferably connected between the fly ball 17 to oppose the major portion of the centrifugal force, thereby reducing the force transmitted through the collar and the lever. The remainder of the force is transmitted to the spring 24 in the manner described.

Due to the characteristics of a synchronous generator, the speed of the unit is controlled by the frequency of the current in the line 13. If the speed changer is operated while the unit is connected to the line, the effect will be to change the rate of motive fluid admission, as the tension of the spring 24 will not be varied to a great extent by a change in centrifugal force of the fly balls 17. For example, if the stem 26 is raised, the right hand end of the lever 22 is raised to move the admission valve 11 in opening direction. This is the well known manner of changing the load on an individual prime mover connected to a power line or system.

To the mechanism so far described, which is old and well known in the art, I apply my novel load-limiting device, indicated generally by the numeral 32. Referring particularly to Fig. 5, this device includes a clutch element 33 fixed on a rotatable shaft 34. A lever 35 is also fixed on the shaft 34 and is connected, as shown in Fig. 1, to the upper end of a rod 36, the lower end of which is connected to the right-hand arm of the lever 22. A second clutch element 37, adapted to engage the first clutch element, is mounted on the shaft 34 but is rotatable and axially movable relative thereto.

The clutch elements are enclosed within a housing 38, which is also angularly movable about the axis of the shaft 34. The clutch element 37 and the housing 38 are held against relative rotation by lugs 39 formed on the clutch element 37 and lugs 41 carried on the housing 38, the lugs 41 having recesses 42 into which the lugs 39 project.

The clutch element 37 is formed with a tubular part 43, which encompasses the shaft 34 and extends within a cylinder 44. A piston 45, for moving the clutch element 37 into and out of engagement with the clutch element 33, is fixed on the tubular part 43 within the cylinder 44. The application of fluid pressure to the piston is controlled by a pilot valve 46 disposed in a casing 47. The casing is formed with ports 48 and 49 communicating with the upper and lower portions of the cylinder 44 through conduits 51 and 52, respectively. It is further formed with a port 53 communicating through a conduit 54 with any suitable source of fluid pressure. Discharge ports 55 and 56 are also provided.

The pilot valve is provided with piston portions 57, 58, and 59. These piston portions are so disposed that in the raised position of the pilot valve shown in Fig. 5, the space between the piston portions 58 and 59 places the ports 53 and 48 in communication, admitting fluid pressure to the upper portion of the cylinder 44. The space between the piston portions 57 and 58 places the ports 49 and 55 in communication. When the pilot valve is in lowered position, the space between the piston portions 57 and 58 places the port 49 in communication with the fluid supply port 53 and the space between the piston portions 58 and 59 places the port 48 in communication with the discharge port 56. A spring 61, which approximately balances the weight of the pilot valve, is preferably provided.

A lever 62 is fulcrumed intermediate its ends on a bracket 63 by means of a pivot 64. The left-hand arm of the lever is connected to the pilot valve 46, and the right-hand arm has a magnet armature 62'. A solenoid 65 is disposed above and a solenoid 66 below the armature 62' for actuating the lever 62. A tension spring 67 is connected at one end to the right-hand arm of the lever 62 and at its other end to a stationary bracket 68. By arranging the bracket 68 so that the center line of the spring passes through the center of the pivot 64 in an intermediate position of the lever, the spring is effective to hold the right-hand arm of the lever in the upper position when it has been moved to that position by the solenoid 65 and to hold it in the lowered position when it has been moved downwardly by the solenoid 66.

When the solenoid 66 is energized, the pilot valve 46 is raised and fluid pressure is admitted to the upper portion of the cylinder 44. The clutch element 37 is held downwardly out of engagement with the clutch element 33, the latter being thus free to rotate and permitting the governor to operate independently of the load-limiting device. When the solenoid 65 is energized, the pilot valve 46 is moved to lowered position, admitting fluid pressure to the lower position of the cylinder 44. The clutch element 37 is moved into engagement with the clutch element 33, thereby preventing relative rotation between the clutch elements.

Referring to Fig. 1, the housing 38 is formed with a projecting lug 69. A spring 71 under initial compression is interposed between a stationary bracket 72 and the upper side of the lug, and a spring 73 also under initial compression is interposed between the lower side of the lug and a stationary bracket 74. A spring-holding member 75 is provided for each spring at the end adjacent the lug 69 and is fixed to a stem 76 which extends through the bracket at the other end of the spring. A nut 77 is placed on the end of the stem and bears against the bracket. Expansion of each spring beyond its initial compression is thereby avoided upon movement of the lug away from the spring. The springs 71 and 73 yieldably restrain movement of the housing 38 from a given angular position.

A suitable source of electrical energy, such as a battery 78, is provided for energizing the solenoids 65 and 66. The solenoid 65 is connected to the battery 78 through a circuit containing conductors 79 and 81, a manually operated switch 82, a conductor 83, the solenoid 65, a conductor 84 and the battery 78. The circuit for the solenoid 66 is traced through the conductor 79, a conductor 85, a manually operated switch 86, a conductor 87, the solenoid 66, conductors 84' and 84 and the battery 78. The circuit for the solenoid 66 is also adapted to be closed automatically upon a predetermined angular movement of the housing 38. To accomplish this, the switch 86 is shunted by a branch circuit including the conductor 79, a contactor 88 carried by the lug 69 but electrically insulated therefrom, one of two contactors 89 and 90 disposed, respectively, above and below the contactor 88 and adapted to contact therewith upon sufficient movement of the housing 38, and a conductor 91 which connects the contactors 89 and 90 with the conductor 87.

The operation of the embodiment shown in Figs. 1 and 5 is as follows:

Starting with the load limiting device in the inoperative position shown on the drawings, and the turbine and generator unit 10—12 connected to the line 13, the admission valve is brought to the position for carrying the desired load on the unit. The switch 82 is then momentarily closed, energizing the solenoid 65. The lever 62 moves the pilot valve 46 downwardly, and the clutch elements 37 and 33 are brought into engagement. The housing 38 and the lever 35 are, therefore, maintained in fixed angular relation to each other. Any change in the position of the admission valve 11 is resisted by the springs 71 and 73. Therefore, so long as the speed of the unit remains within a normal range, the position of the admission valve 11 remains fixed.

If, now, the generators connected to the system 13 are unable to carry the load on the system, the frequency will drop. As the centrifugal force of the fly-balls 17 decreases, the unbalanced force of the spring 24 opposes the force of the spring 73 and, after the speed drops below the normal range, or below any desired predetermined speed, this unbalanced force overcomes the spring 73 and moves the housing 38 in counterclockwise direction. The contractors 88 and 90 are brought into contact to close the circuit to the solenoid 66. The lever 62 moves the pilot valve upwardly as already explained to effect disengagement of the clutch elements 33 and 37.

The spring 24 thereupon becomes effective to move the admission valve 11 in opening direction, and the governor operates independently of the load-limiting device. The unit may now carry a greater load to maintain the frequency as nearly normal as possible. The housing 38 is brought back to its normal position by the spring 73, again opening the circuit to the solenoid 66, the spring 67 serving to retain the right-hand end of the lever 62 in lowered position.

The action of the load limiting device may also be discontinued at the will of the operator by closing the switch 86.

Assume, now, the load limiting device again to be operative and that the speed of the turbine 10 becomes excessive. This may be due to opening of the circuit breaker 15. The centrifugal force of the fly-ball 17 now exceeds the force of the spring 24, and when the increase in force exceeds a predetermined amount corresponding to the maximum speed which it is desired to permit, it overcomes the force of the spring 71 and moves the housing 38 in clockwise direction. The contactor 88 and the contactor 89 are now brought into engagement, and the solenoid 66 is again energized to render the load limiting device inoperative. The governor then becomes effective to move the admission valve 11 in closing direction to maintain the speed of the turbine within the governing range.

Referring to Fig. 1, a spring 73 of such characteristics must be chosen that it will yield to a force of the spring 24 corresponding to a predetermined departure from normal speed, and likewise, the spring 71 must be so chosen that it will yield to the excess centrifugal force of the fly-balls 17 corresponding to a predetermined increase above normal speed. In order to provide for adjustment of the permissible departure above or below the normal speed, a spring nut 71', shown in Fig. 2, may be screw threaded in each of the brackets 72 and 74. By rotating the spring nut, the initial compression of the spring may be varied.

In the normal position of the housing 38, the forces of the spring 71 and 73 on the lug 69 balance each other. Expansion of each spring beyond this position, however, is restrained by the spring-holding member 75, so that the full force of the other spring must be overcome before the contactor 88 is brought into engagement with one of the contactors 89 and 90.

In Fig. 3, is shown a modified form of load-limiting device whose action is unyielding in the direction of increased valve opening, but is yieldable in the direction of decreased valve opening in the same manner as in the embodiment shown in Fig. 1. To accomplish this, the lower spring 73 is replaced by a solid block 92.

In Fig. 4 is shown an embodiment of a load-limiting device which yieldably resists increased valve opening, but does not restrict valve closing movement from the position at which the load limiting device is set. The upper spring 71 is replaced by a solid block 93. The arm 35 is biased downwardly by a spring 94. A pivot pin 96, carried by the lever 35 for pivotally connecting the lever to the link 36, is disposed in a slot 95 in the upper end of the link.

The spring 94 maintains the pivot pin at the lower end of the slot 95 when the clutch elements are out of engagement. To set the load-limiting device, the admission valve is brought to the desired position in the same manner as in the first embodiment and the clutch elements then brought into engagement. Due to the slot 95, the link 36 may move downwardly from this position, permitting the right-hand end of the lever 22 to move downwardly in valve-closing direction.

This load limiting device, therefore, does not place any restriction upon the valve-closing action of the governor. Valve opening movement beyond the position at which the device is set is yieldably resisted in the same manner as in the first embodiment.

It will be noted that, in order to set my novel load-limiting device to any desired load, it is only necessary to adjust the speed changer mechanism to the desired load and to set the load limiting device to effect engagement of the clutch elements. No adjustment of the load-limiting device is necessary, since the clutch element 37 is automatically brought to proper position by the governor and is yieldingly held in whatever position it occupies when the load-limiting device is set.

While I have shown my invention in three forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a prime mover and a governing mechanism responsive to the speed of the prime mover and controlling the admission of motive fluid thereto, of a device for limiting the governing mechanism to any desired maximum rate of admission comprising a clutch element movable to various positions corresponding to various rates of admission provided by the governing mechanism, means for so connecting the governing mechanism and the clutch element that the governing mechanism cannot provide a rate of admission greater than that corresponding to the position of the clutch element, a second clutch element adapted to engage the first clutch element, means for effecting engagement of said clutch elements, yieldable means for resisting movement of the second clutch element in the direction of increasing the rate of admission; and means responsive to movement of the second clutch element for disengaging said clutch element.

2. The combination with a prime mover and a governing mechanism responsive to the speed of the prime mover and controlling the admission of motive fluid thereto, of a device for limiting the movement of the governing mechanism in one direction to any desired rate of admission comprising a clutch element movable to various positions corresponding to various positions of the governing mechanism means for so connecting the governing mechanism and the clutch element that the governing mechanism cannot move in said one direction beyond the position corresponding to the position of the clutch element, a second clutch element adapted to engage the first clutch element, means for effecting engagement of said clutch elements, yieldable means for resisting movement of the second clutch element, and means responsive to movement of the second clutch element for disengaging said clutch elements.

3. The combination with a prime mover and a governing mechanism responsive to the speed of the prime mover and controlling the admission of motive fluid thereto, of a device for limiting the movement of the governing mechanism in one direction to any desired rate of admission comprising a clutch element movable to various positions corresponding to various positions of the governing mechanism, means for so connecting the governing mechanism and the clutch element that the governing mechanism cannot move in said one direction beyond the position corresponding to the position of the clutch element, a second clutch element adapted to engage the first clutch element, means for effecting engagement of said clutch elements, means for resisting movement of the second clutch element in the direction corresponding to said one direction of the governing mechanism, and means responsive to a speed outside of the normal range of speed of the prime mover and disengaging said clutch elements.

4. The combination with a prime mover and a governing mechanism responsive to the speed of the prime mover and controlling the admission of motive fluid thereto, of a device for limiting the movement of the governing mechanism in one direction to any desired rate of admission comprising a clutch element movable to various positions corresponding to various positions of the governing mechanism, means for so connecting the governing mechanism and the clutch element that the governing mechanism cannot move in said one direction beyond the position corresponding to the position of the clutch element, a second clutch element adapted to engage the first clutch element, yieldable means for resisting movement of the second clutch element in the direction corresponding to said one direction of the governing mechanism, pressure-actuated means for moving said clutch elements into or out of engagement, pilot valve means for controlling the application of fluid pressure to said pressure-actuated means and being movable to one position to provide engagement of the clutch elements and to a second position to disengage the clutch elements, means for holding the pilot valve means in whichever position it may be moved, manually controlled means for moving the pilot valve means to the first position, means responsive to movement of the second clutch element against said yieldable means for moving the pilot valve means to the second position, and manually controlled means for moving the pilot valve means to the second position.

5. The combination with a prime mover and a governing mechanism responsive to the speed of the prime mover and controlling the admission of motive fluid thereto, of a device for limiting the movement of the governing mechanism in one direction to any desired rate of admission comprising a clutch element movable to various positions corresponding to various positions of the governing mechanism, means for so connecting the governing mechanism and the clutch element that the governing mechanism cannot move in said one direction beyond the position corresponding to the position of the clutch element, a second clutch element adapted to engage the first clutch element, yieldable means for resisting movement of the second clutch element in the direction corresponding to said one direction of the governing mechanism, pressure-actuated means for moving said clutch elements into or out of engagement, pilot valve means for controlling the application of fluid pressure to said pressure-actuated means and being movable to one position to provide engagement of the clutch elements and to a second position to disengage the clutch elements, means for holding the pilot valve means in whichever position it may be moved, manually controlled means for moving the pilot valve means to the first position, means responsive to the speed of the prime mover outside of the normal range of speed for moving the pilot valve means to the second position, and manually controlled means for moving the pilot valve means to the second position.

6. The combination with a governing mechanism for a prime mover, of a device for holding the governing mechanism at any given rate of admission comprising a rotary shaft whose angular position varies as a function of the rate of fluid admission provided by the governing mechanism, a friction disc mounted on said shaft, a second friction disc adapted to engage the first friction disc, means for resisting angular movement of the second friction disc, and means for effecting engagement of said friction discs.

7. The combination with a governing mechanism for a prime mover, of a device for holding the governing mechanism at any given rate of admission comprising a rotary shaft whose angular position varies as a function of the rate of fluid admission provided by the governing mechanism, an element non-rotatably mounted on said shaft, a second element adapted to engage the first element, means for resisting movement of the second element angularly about the axis of said shaft, and means for bringing said elements into engagement.

8. The combination with a prime mover and a governing mechanism responsive to the speed of the prime mover and controlling the admission of motive fluid thereto, of a device for maintaining the governing mechanism at any predetermined rate of admission comprising a rotatable shaft which is connected to the governing mechanism and whose position varies as a function of the rate of motive fluid admission provided by the governing mechanism, a clutch element mounted on said shaft, a second clutch element adapted to engage the first clutch element, yieldable means for resisting angular movement of the second clutch element from a given angular position, means for effecting engagement of the clutch elements, and means responsive to a predetermined departure of the second clutch element from said given angular position for disengaging the clutch elements.

9. The combination with a prime mover and a governing mechanism responsive to the speed of the prime mover and controlling the admission of motive fluid thereto, of a device for maintaining the governing mechanism at any desired rate of admission comprising a clutch element which is connected to the governing mechanism and whose position varies as a function of the motive fluid admission provided by the governing mechanism, a second clutch element adapted to engage the first clutch element, means for resisting movement of the second clutch element from a given position, and means for bringing said clutch elements into engagement.

10. The combination with a prime mover and a governing mechanism responsive to the speed of the prime mover and controlling the admission of motive fluid thereto, of a device for limiting the governing mechanism to any desired maximum rate of admission comprising a clutch element movable to various positions corresponding to various rates of admission provided by the governing mechanism, means for so connecting the governing mechanism and the clutch element that the governing mechanism cannot provide a rate of admission greater than that corresponding to the position of the clutch element, a second clutch element adapted to engage the first clutch element, and means for resisting movement of the second clutch element in the direction of increasing the rate of admission.

11. The combination with a prime mover and a governing mechanism responsive to the speed of the prime mover and controlling the admission of motive fluid thereto, of a device for limiting the governing mechanism to any desired maximum rate of admission comprising a rotatable clutch element movable to various angular positions corresponding to various rates of admission provided by the governing mechanism, means for so connecting the governing mechanism and the clutch element that the governing mechanism cannot provide a rate of admission greater than that corresponding to the position of the clutch element, a second clutch element adapted to engage the first clutch element, means for resisting angular movement of the second clutch member in at least one direction, and means for axially moving one of said clutch elements into engagement with the other comprising a pressure-actuated element coaxial with and connected to said one clutch element, and pilot valve means for controlling the application of fluid pressure to said pressure-actuated element.

12. The combination with a prime mover and a governing mechanism responsive to the speed of the prime mover and controlling the admission of motive fluid thereto, of a device for maintaining the governing mechanism at any desired rate of admission comprising a rotatable clutch element connected to the governing mechanism and whose angular position varies as a function of the admission provided by the governing mechanism, a second clutch element adapted to engage the first clutch element, yieldable means for resisting angular movement of the second clutch element from a predetermined angular position in at least one direction, and means for axially moving one of said clutch elements into engagement with the other comprising a pressure-actuated element coaxial with and connected to said one clutch element, and pilot valve means for controlling the application of fluid pressure to said pressure-actuated element.

13. The combination with a prime mover and a governing mechanism responsive to the speed of the prime mover and controlling the admission of motive fluid thereto, of a device for limiting the governing mechanism to any desired maximum rate of admission comprising a rotatable clutch element movable to various angular positions corresponding to various rates of admission provided by the governing mechanism, means for so connecting the governing mechanism and the clutch element that the governing mechanism cannot provide a rate of admission greater than that corresponding to the position of the clutch element, a second clutch element adapted to engage the first clutch element, yieldable means for resisting angular movement of the second clutch element in the direction of increasing the motive fluid admission beyond a predetermined angular position, means for axially moving one of said clutch elements into engagement with the other comprising a pressure-actuated element coaxial with and connected to said one clutch element and pilot valve means for controlling the application of fluid pressure to said pressure-actuated element, and means responsive to a predetermined angular movement of the second clutch element in the direction of increase in admission beyond said predetermined angular position for controlling the pilot valve means to effect disengagement of the clutch elements.

In testimony whereof, I have hereunto subscribed my name this 27th day of January, 1931.

FRANCIS HODGKINSON.